United States Patent [19]
Cadiou

[11] 3,946,827
[45] Mar. 30, 1976

[54] CONTROL UNIT FOR A VEHICLE AND DASHBOARD INCORPORATING SAME

[75] Inventor: Jean Georges Cadiou, Saint-Cloud, France

[73] Assignee: Societe Anonyme Automobiles Citroen, Paris, France

[22] Filed: Dec. 11, 1974

[21] Appl. No.: 531,770

Related U.S. Application Data

[63] Continuation of Ser. No. 312,305, Dec. 5, 1972, abandoned.

[30] Foreign Application Priority Data

Dec. 6, 1972  France .............................. 72.43650

[52] U.S. Cl. ................................ 180/90; 280/87 R
[51] Int. Cl.² .......................................... B60K 37/06
[58] Field of Search ............... 180/77 S, 78, 89, 90; 280/87 R; 296/78; D12/192

[56] References Cited
UNITED STATES PATENTS

| | | | |
|---|---|---|---|
| 2,804,931 | 9/1957 | Najjar ................................... | 180/90 |
| 3,176,537 | 4/1965 | Zeigler.................................. | 180/90 |

FOREIGN PATENTS OR APPLICATIONS

| | | | |
|---|---|---|---|
| 115,532 | 5/1918 | United Kingdom................... | 180/78 |
| 1,962,810 | 7/1970 | Germany .............................. | 180/90 |
| 935,646 | 11/1955 | Germany .............................. | 180/78 |
| 1,128,302 | 4/1962 | Germany .............................. | 180/78 |

OTHER PUBLICATIONS

Industrial Design Magazine, Feb. 1970, pp. 38–41.

*Primary Examiner*—Robert J. Spar
*Assistant Examiner*—Ross Weaver
*Attorney, Agent, or Firm*—Fitzpatrick, Cella, Harper & Scinto

[57] ABSTRACT

This invention relates to a control unit with which is equipped a vehicle provided with a steering wheel coupled to the rotary member controlling the steering members, comprising at least two control members disposed on the side opposite the driver with respect to the steering wheel, whilst these members have actuating surfaces whose centres define, with the axis of the rotary member, half-planes shifted by a first angle. The directions perpendicular to the actuating surfaces and passing through the centres are contained in planes parallel to the axis which form a second angle larger than the first, whilst the intersection is disposed with respect to the plane parallel to the axis of the rotary member and containing the centres of the two actuating surfaces, substantially on the side where said axis is itself disposed.

This invention may be applied to the production of a dashboard providing greater safety.

15 Claims, 13 Drawing Figures

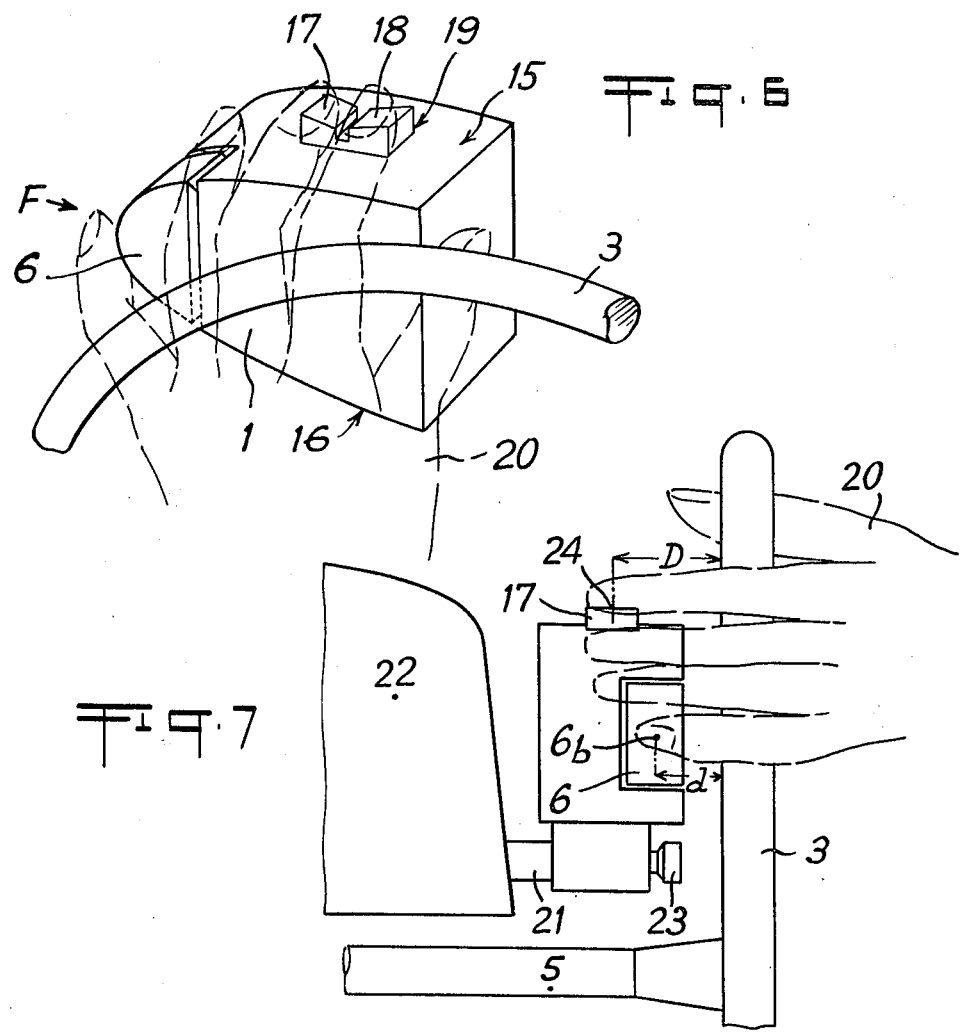
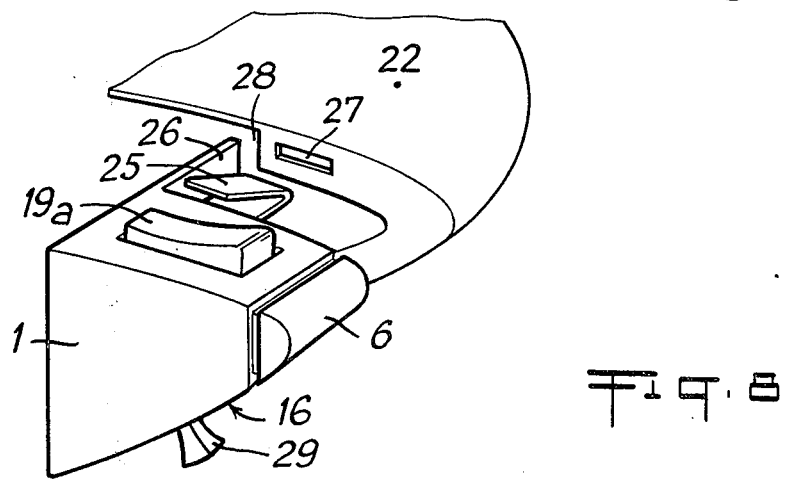

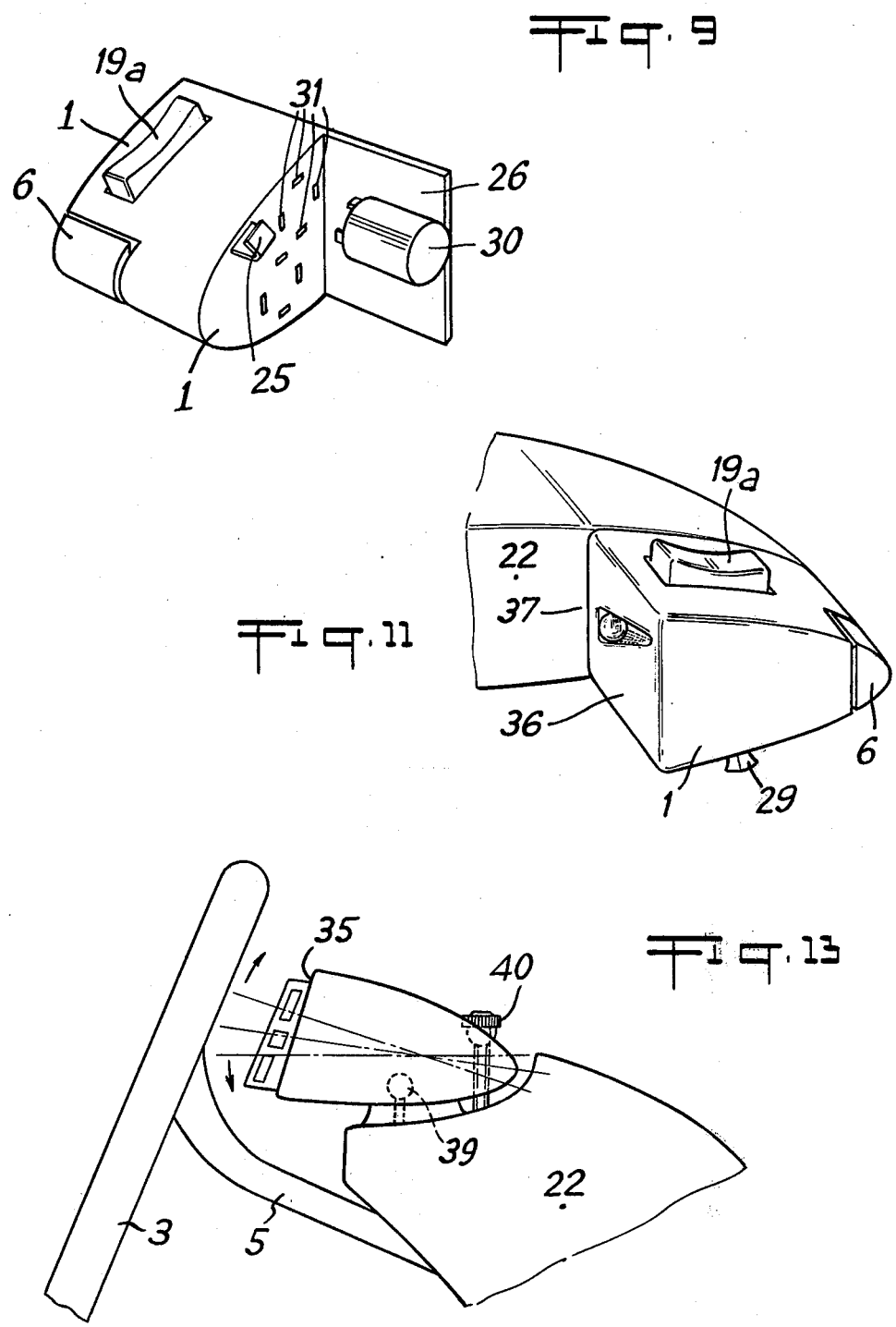

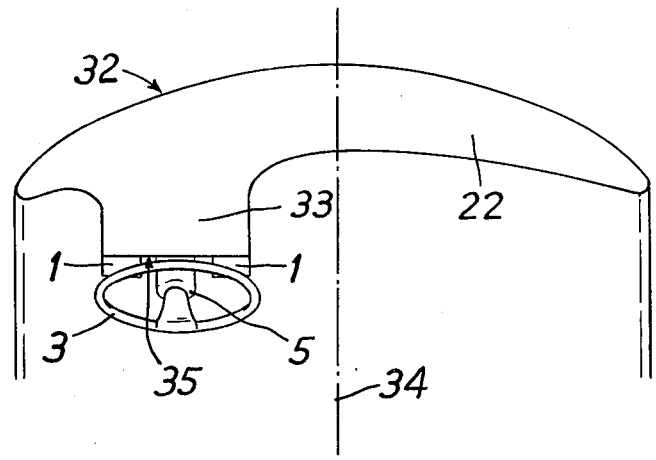
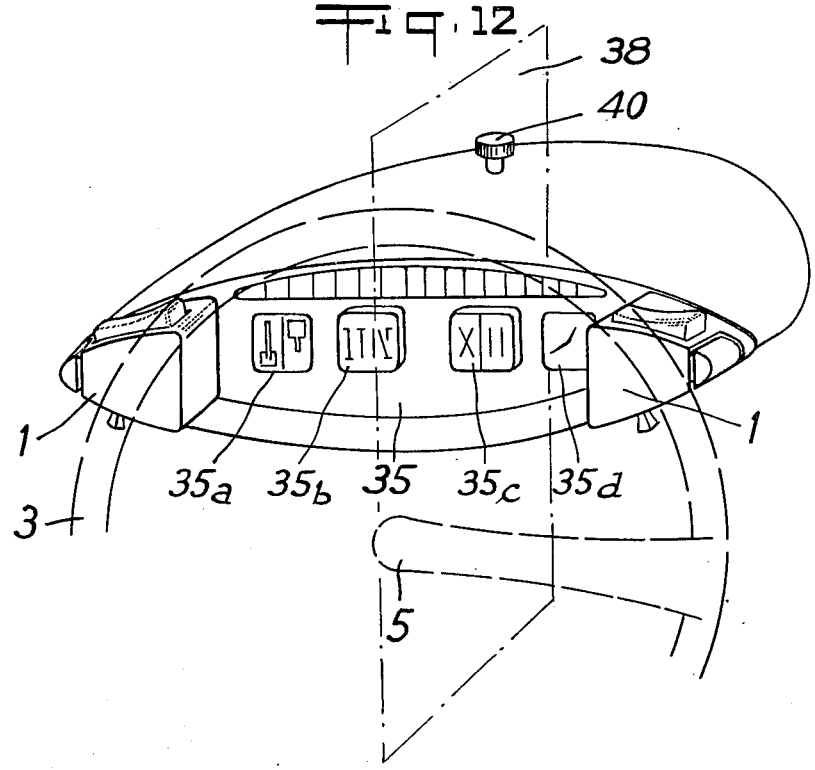

CONTROL UNIT FOR A VEHICLE AND DASHBOARD INCORPORATING SAME

This is a continuation, of application Ser. No. 312,305, filed Dec. 5, 1972, now abandoned. In the domain of vehicles, particularly motor vehicles, great importance is attached to the present preoccupation of obtaining an increased safety in driving.

One of the most effective means generally retained for increasing safety resides in a simplification of the driving manoeuvres. It is for this reason that the functioning of an increasing number of members is being rendered automatic.

However, at the same time as this tendency, there is an opposite trend which results in a complication in driving, caused by the presence of an increasing number of equipment members, e.g. direction indicator, windscreen washer, window raiser, radio, etc. which are of relatively recent general use. This equipment is controlled by means of control members which are most often spread out all over the dashboard and are not easily accessible, to the driver sitting in the driver's seat.

However, combined assemblies have been known for a long time, which unite the controls of the headlights, direction indicators or horn, the control members then being constituted by levers disposed beneath the steering wheel. The control members of such assemblies can therefore be easily reached by the driver, without his having to remove his hands from the steering wheel. Nevertheless, the above-mentioned assemblies are not certain to handle, since the control members that they comprise are in very similar positions and are also too similarly constructed to be able to be identified rapidly and with certitude. This results in errors in driving which may be serious, the driver not experienced in driving the vehicle in question switching off the headlights, for example, when he intended to use the horn.

It is to remedy the above-mentioned gaps that the invention proposes a new control unit of which the control members are simple and sure to manipulate, and which is also easy to assemble on the vehicle; this leads to the production of a satisfactorily visible and accessible dashboard, thus contributing to the driving safety of the vehicle.

The invention has therefore firstly for an object a control unit with which is equipped a vehicle provided with a prehension element such as a steering wheel, a rotary member for controlling the steering members of said vehicle, comprising at least two control members, with little or no displacement, disposed on the side opposite the driver with respect to said prehension element, whilst two of said control members have actuating surfaces, the centres of which define, with the axis of the rotary member, halfplanes shifted by a first angle.

The directions perpendicular to the actuating surfaces and passing through said centres are contained in planes, parallel to said axis, which form a second angle larger than the first angle. The intersection of said planes containing said directions is disposed, with respect to the plane parallel to the rotary member and containing the centres of the two actuating surfaces, substantially on the side where said axis is itself disposed.

The intersection is preferably contained substantially in the angle defined by the half-planes containing said axis and each of the centres of the two actuating surfaces respectively.

Moreover, the prehension element being in the position corresponding to the rectilinear displacement of the vehicle, said intersection is advantageously disposed with respect to the cylindrical surface of generatrices parallel to the axis of the prehension element and bearing on said prehension element, substantially on the side opposite said axis.

In addition, the first angle is preferably an acute angle.

When the control members may be displaced slightly, the direction of displacement of each of said control members is substantially parallel to the direction perpendicular to the actuating surface of the corresponding control member.

When the control members are with zero displacement, said control members have a capacitive effect.

Said two control members are also advantageously disposed at different distances from the prehension element.

Similarly, the outside appearances of the two control members are preferably distinct and in particular have forms which differ as far as touch is concerned.

This control unit often comprises, in addition to the two control members mentioned, a third control member which is in a relative disposition with respect to a first of the two control members, substantially identical to the relative disposition of the first and second of said two control members with respect to each other.

Moreover, this third control member is distinct from said two control members and has in particular a distinctly different touch from those of the two control members, The third control member and the second of said two control members are grouped into a single rocker switch in the case of members with slight displacement or a switch having two projections with respect to the external face adjacent said control unit, when the control members are with zero displacement.

This control unit is advantageously defined at least partly by a substantially cylindrical surface which has an upper face and a lower face. The single switch is then disposed on the upper face, whilst the line perpendicular to the actuating surface of the first of said two control members and passing through the centre of said actuating surface is substantially horizontal.

The actuating surface of the first of said two control members is disposed in the zone of connect of the upper and lower faces, said zone being substantially continuous.

In addition, a control member is sometimes disposed on said lower face and is constituted by a lever mounted to pivot about an axis substantially parallel to the axis of the rotary member.

The control unit is provided to be adjustable in position with respect to the structure of the vehicle, by a means known per se.

After the prehension element has been disposed in a given position with respect to the structure, the position of the control unit is adjusted with respect to said prehension element as a function of the morphological form of the driver, and particularly the size of his hands, so that the control members are disposed within reach of at least one of these hands, when they rest on said prehension element in the normal driving position.

Moreover, this control unit is fixed to the structure of the vehicle by means of a device for removably holding it in position, provided with a means for rapidly making the connections.

Furthermore, in an advantageous disposition, a support is coupled to the structure and constitutes a projection from the dashboard directed longitudinally in the vehicle, whilst said control unit is fixed to this projection.

Finally, this control unit comprises an inner face oriented substantially towards the rotary member, whilst one of the control members comprises a control light which indicates functioning, which is advantageously disposed on said inner face.

The invention also has for its object a dashboard incorporating said two units, these two units being disposed substantially symmetrically with respect to a plane parallel to the vertical longitudinal plane of the vehicle and passing substantially through the axis of the rotary member.

In addition, this dashboard comprises an assembly which groups substantially all the members for visually checking the functioning of the vehicle, said checking assembly being disposed between the two control units.

This visual checking assembly is preferably adjustable in position with respect to the structure of the vehicle. The adjustment of position of said assembly, particularly the adjustment of its inclination substantially parallel to the vertical longitudinal plane of the vehicle; is effected as a function of the location of the driver's eyes, when he is sitting in his normal driving position.

The invention will be more readily understood upon reading the following description given with reference to the accompanying drawings, in which:

FIG. 6 is a perspective view of a control unit according to the invention;

FIG. 7 is a view in the direction of arrow F of FIG. 6;

FIG. 8 is a view showing the mode of assembling a control unit according to the invention on the structure of the vehicle.

FIG. 9 shows a detail of a control unit according to the invention;

FIG. 10 shows a plan view of a variant assembly of control units according to the invention;

FIG. 11 shows a detail of the inner face of a control unit according to the invention;

FIG. 12 is a perspective view of a dashboard using the control units according to the invention;

FIG. 13 shows a detail of the dashboard shown in FIG. 12.

Figure 1:
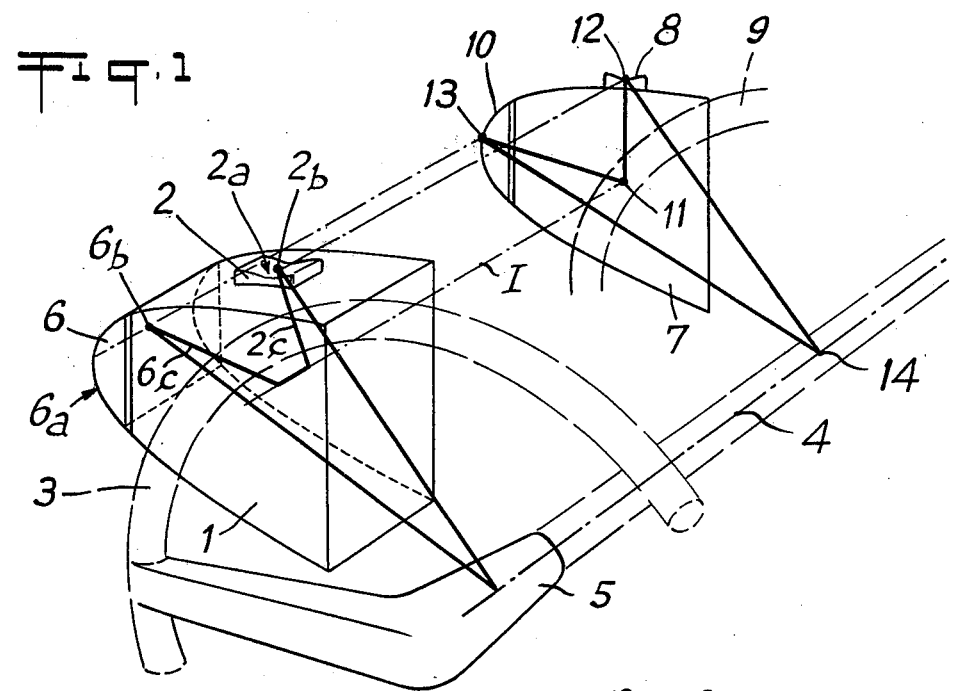
FIG. 1 is a perspective view of a control unit according to the invention.

Referring now to the drawings, FIG. 1 shows a control unit 1 provided with a rocker switch 2 for controlling the direction indicators of a vehicle, which comprises a steering wheel 3 connected with the drive wheels and mounted to rotate on the structure about the axis 4 of a hub 5. The unit 1 also comprises the push button 6 of a horn. The switch 2 and button 6 have actuating surfaces and centres of actuating surfaces 2a, and 6a, and 2b and 6b respectively. The directions perpendicular at 2b, 6b to the surfaces 2a, 2b constitute the perpendicular lines 2c, 6c to the two surfaces.

The following five planes or half-planes are then taken into consideration: -half-plane 4–2b containing axis 4 and passing through centre 2b;

-half-plane 4–6b containing the axis 4 and passing through centre 6b;

-plane 2c containing the perpendicular line 2c and parallel to the axis 4;

plane 6c containing the perpendicular line 6c and parallel to the axis 4;

-and plane 2b–6b passing through the centres 2b and 6b and parallel to axis 4.

It is firstly ascertained that planes 2c and 6c have an intersection I which, of course, is parallel to the axis 4, the perpendiculars 2c and 6c not necessarily being secant with respect to one another, as shown in FIG. 1.

In order to facilitate the subsequent description, a projection is then made on a plane perpendicular to axis 4. It is then ascertained that the unit 1, switch 2, steering wheel 3, button 6, intersection I, centres 2b and 6b and axis 4 are projected into 7, 8, 9, 10, 11, 12 and 13 and 14, respectively.

It will be noted that the angle 12-11-13 is greater than angle 12-14-13. This first arrangement is in accordance with the invention and is also noteworthy in that the projections 11 of the intersection and 14 of the axis 4 are located on the same side with respect to straight line 12, 13.

Figure 2:
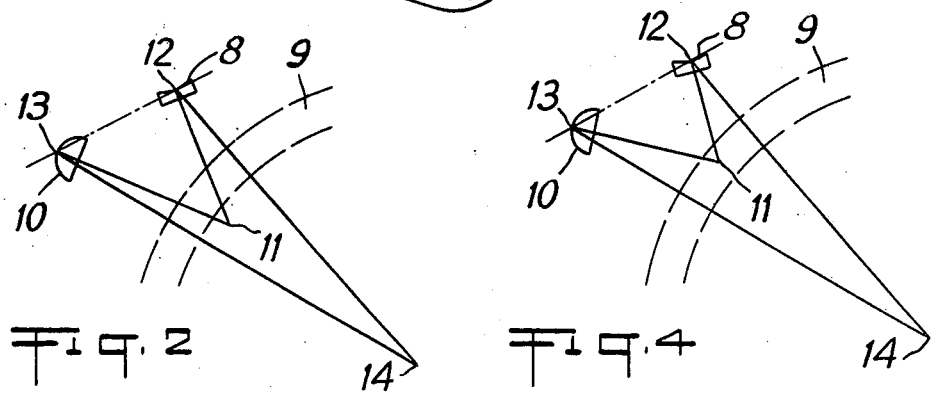
FIGS. 2 to 5 are schematic projections, on a plane perpendicular to the axis of the rotary member, of a control unit according to the invention.

This disposition is particularised as shown in FIG. 2, by indicating that the projection 11 is contained in the angle 12-14-13.

Figure 3:
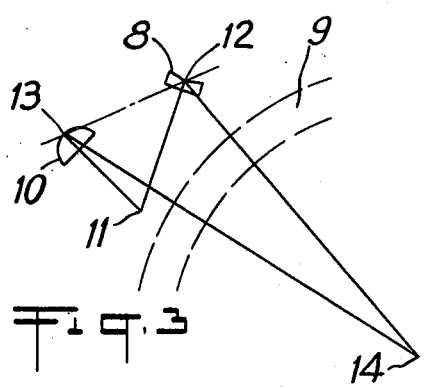

Still with the disposition of FIG. 1 in mind, another particular disposition is reached, which is shown in FIG. 3, in which not only the projections 11 and 14 are located on the same side with respect to the straight line 13, 13 but also the projection 11 is disposed, with respect to the projection 9 of the steering wheel, on the side opposite the one where the projection 14 is located. Of course, the recommended dispositions are only approximate and the limiting dispositions are also protected within the scope of the present invention.

Figure 4:
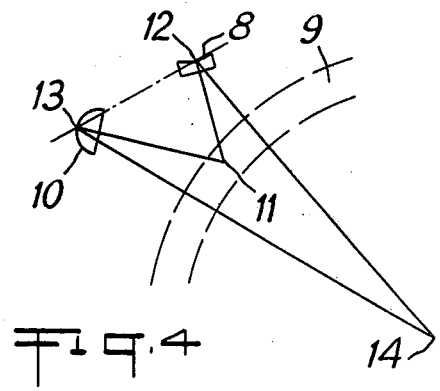

FIG. 4 consequently shows an advantageous combination of the two preceding solutions, the projection 11 then being contained in the angle 12-14-13, and substantially on the side opposite the projection 14 with respect to the projection 9 of the steering wheel, being in fact within the limits of the projection 9 of said steering wheel.

Figure 5:
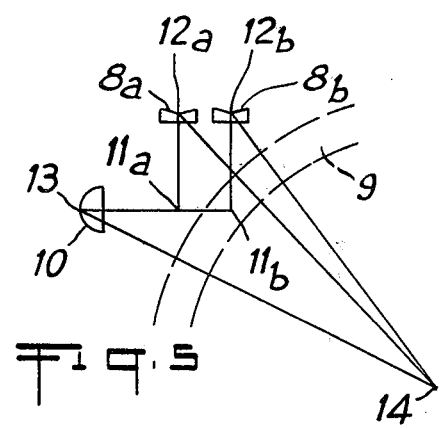

FIG. 5 shows an arrangement in which there is no single member having a projection 8, but two control members having projections 8a and 8b, which are in an identical disposition with respect to the projection 10. The projections of the respective intersections are at 11a and 11b, the projections of the centres of the surfaces themselves being at 12a and 12b. The control members are at unequal distances from the steering wheel, in the same way as their projections are from projection 14.

On this disposition are found two variant embodiments which are shown, one in FIGS. 6 and 7, the other in FIG. 8.

The actual representation of the control unit is taken in FIGS. 6 to 8.

FIG. 6 shows that the unit 1 is limited by a cylindrical surface having an upper face 15 and a lower face 16. A push button 6 is disposed in the zone of connection of faces 15 and 16, which is substantially continuous. Furthermore, the two members which have projections 8a and 8b, constitute in fact members with zero displacement, preferably with capacitive effect, and are shown by projections 17 and 18, of the same switch 19.

The projections 17 and 18 pass beyond the upper face 15 which is adjacent thereto. Finally, it may be seen that the projections 17 and 18 have distinct slopes which enable them to be distinguished with certitude, and are also distinct from the push button 6 which is curved and not flat like said projections 17 and 18.

It may be seen from FIG. 7 that a slide 21 is integral with the structure 22 of the vehicle. The unit 1 is slidably mounted thereon and is adjustable in position, in its whole, with respect to the steering wheel 3, by means of a screw 23, so that the driver's hand 20, resting on the steering wheel 3, may reach the projection 17 and the push-button 6. Furthermore, it will be noted that the projection 17 and button 6 have their respective centres 24 and 6b disposed at distances from the steering wheel 3, D and d respectively, which are unequal.

FIG. 8 shows another type of control unit according to the invention. There is a push button 6 and a switch 19a similar to 19, but rocking, these two control members being disposed substantially in the same way as shown in FIGS. 6 and 7. This unit 1 is provided with clips 25 and a guide plate 26 which, when the unit 1 is disposed opposite the structure 22, for the purpose of being mounted, are respectively disposed opposite openings 27 and 28 arranged in said structure. The control unit 1 is therefore removably mounted on the structure 22. Moreover, this unit 1 comprises a lever 29 pivoting about an axis substantially parallel to that of the hub 5 of the steering wheel 3. The lever 29 is disposed on the lower face 16 of the unit 1.

The unit of FIG. 8 is shown again in FIG. 9, but seen from the rear side. FIG. 9 shows an element 30 which contains all the circuits and mechanisms ensuring a given function, such as for example the direction indicating control. This element 30 may be plugged into connection sockets 31 made in the unit 1 and is consequently removably mounted on the unit 1.

FIG. 10 shows a plane view of the interior of a vehicle provided with a steering wheel 3. It will be noted in this view that the lower edge 32 of the windscreen is curved, whilst the structure 22 of the dashboard extends, at the level of the steering wheel 3, into a projection 33 which is oriented longitudinally in the vehicle, parallel to a vertical plane passing through the longitudinal axis 34 of said vehicle. It will be noted that two control units 1 are disposed substantially symmetrically with respect to the vertical plane passing through the hub 5, whilst between these two units 1 is disposed an assembly 35 which groups substantially all the visual functioning controls of the vehicle (speedometer, revolution-counter, etc.).

FIG. 11 shows a control unit 1 which is disposed on the structure 22 symmetrically with respect to the control unit of FIG. 8, but already mounted on said structure 22. This unit has a rocker switch 19a, a push button 6 and a pivoting lever 29, but there is also provided, on the inner face 36 of the unit 1, a control light 37 which corresponds to the actuation of one of the control members, for example the rocker switch 29.

FIG. 12 shows the symmetry of the disposition of two control units 1 with respect to a vertical plane 38 containing the hub 5 of the steering wheel 3. Between the two units 1 is located an assembly 35 which groups the major part of the visual functioning controls, such as petrol gauge 35a, speedometer 35b, revolution counter 35c or clock 35d.

Finally, with reference to FIG. 13, it will be noted that an assembly 35 is mounted to pivot, on structure 22, about an axis 39 whose inclination is adjustable by means of an adjusting screw 40.

The advantages that may be procured from the arrangements that have just been described as follows;

Firstly, the requirements concerning the value of angle 12-11-13 and the position of point 11 lead to the obtaining of control members which are grouped together, which may thus be reached almost simultaneously by the same hand, but which have distinct directions of actuation (relatively large angle 12-11-13). In this way, not only is it easy to recognize the member which it is desired to actuate, but also one avoids actuating another one. The risk of false manoeuvers is therefore eliminated.

Moreover, in order further to increase the safety of manoeuvre, it has been seen (FIGS. 6 and 7) that said members were also distinct to the touch-projections 17 and 18 substantially flat and push button 6 very curved— and that they were disposed at unequal distances from the steering wheel 3. Consequently, the desired control member is actuated with certitude without it being necessary to look at said member nor to make an effort to remember which control is which. The inequality of the distances, particularly d and D of course avoids the risk of actuating by mistake a control member which would have been disposed too close the effectively actuated member. Moreover, the position of the unit 1 is adjusted as a function of the actual morphology of the driver, by actuating screw 23.

FIGS. 8 and 9 show the advantages of rapid assembly on the vehicle as well as rapid repair of the control units 1. Assembly is instantaneous and is effected by introducing the clips 25 and guide plate 26 into openings 27, 28. The replacement of a possibly faulty element 30 is also almost instantaneous.

In vehicles having highly curved and very inclined windscreens, the steering wheel 3 (FIG. 10) is necessarily disposed relatively far away from the lower edge 32 of the windscreen. The units 1 will then advantageously be mounted on the projection 33, thus clearing the adjacent interior space.

Of course, it is also judicious, in order to constitute a complete one-piece assembly, to provide the control unit with one or more light controls, such as light 37 shown in FIG. 11, indicating that the control members supported by said unit 1 are being actuated.

The symmetry of disposition of the dashboard shown in FIG. 12 enables the driver to have the control units 1 permanently within hand-reach, when he is in his normal driving position, without having to let the steering wheel 3 go. Furthermore, the driver has a good view of the assembly 35, and this may be improved by adjusting the inclination thereof by acting on screw 40.

It will further be noted that the invention may be applied to all vehicles whether the prehension element be a steering wheel 3 or another element such as a handle bar, or a not completely circular steering wheel.

What I claim is:

1. Control unit for use in a vehicle provided with a prehension element such as a steering wheel, and a rotary member connected to said prehension element for controlling the steering members of said vehicle, said unit being mounted adjacent said prehension element and comprising two control members disposed on the side opposite the driver with respect to said prehension element, said control members being disposed within reach of at least one of the hands of said driver when the driver's hands are resting on said prehension element in the normal driving position, said control members having actuating surfaces, the centres of which define, with the axis of the rotary member, half-planes shifted by a first angle, wherein the directions perpendicular to the actuating surfaces and passing through said centres, are contained in planes parallel to said axis, which planes form a second angle larger than the first angle, and the intersection of said planes containing said directions is disposed, with respect to the plane parallel to the axis of the rotary member and containing the centres of the two actuating surfaces, substantially on the side where said axis is itself disposed, said control unit further comprising a third control member which is in a relative disposition with respect to a first of said two control members, substantially identical to the relative disposition of the first and second of said two control members with respect to each other.

2. Control unit for use in a vehicle provided with a prehension element such as a steering wheel, and a rotary member connected to said prehension element for controlling the steering members of said vehicle, said unit being mounted adjacent said prehension element and comprising two control members disposed on the side opposite the driver with respect to said prehension element, said control members being disposed within reach of at least one of the hands of said driver when the driver's hands are resting on said prehension element in the normal driving position, said control members having actuating surfaces, the centres of which define, with the axis of the rotary member, half-planes shifted by a first angle, wherein the directions perpendicular to the actuating surfaces and passing through said centres, are contained in planes parallel to said axis, which planes form a second angle larger than the first angle, and the intersection of said planes containing said directions is disposed, with respect to the plane parallel to the axis of the rotary member and containing the centres of the two actuating surfaces, substantially on the side where said axis is itself disposed, said control unit further comprising a third control member being formed with an exterior configuration which is distinct from said two control members whereby it is identifiable by the sense of touch.

3. A control unit according to claim 1 wherein the third control member and the second of the two said control members are grouped into one single, rocker switch.

4. A control unit according to claim 1 wherein, when the control members are with zero displacement, said control members have a capacitive effect, and wherein the third control member and the second of said two control members are grouped in a single switch having two projections with respect to the external face adjacent said control unit.

5. A control unit according to claim 3 wherein said control unit is defined at least partially by a substantially cylindrical surface which has an upper face and a lower face, the single switch being disposed on said upper face, and the line perpendicular to the actuating surface of the first of the two control members and passing through the centre of said actuating surface being substantially horizontal.

6. A control unit according to claim 5 wherein the actuating surface of the first of said two control members is disposed in the zone of connection of the upper and lower faces, said zone being substantially continuous.

7. A control unit according to claim 5 wherein a control member is disposed on said lower face and is constituted by a lever mounted to pivot about an axis substantially parallel to the axis of the rotary member.

8. A control unit according to claim 1 wherein said control unit is adjustable in position with respect to the structure of the vehicle, by a means known per se.

9. A control unit according to claim 8 wherein means are provided so that after the prehension element has been disposed in a given position with respect to the structure, the position of the control unit is adjustable with respect to said prehension element as a function of the morphological form of the driver, and particularly the size of his hands, so that the control members are disposed within reach of at least one of said hands, when they rest on said prehension element in the normal driving position.

10. A control unit according to claim 1 wherein said unit is fixed to the structure of the vehicle by means of a device for removably holding it in position, and provided with a means for rapidly making the connections.

11. A control unit according to claim 1 wherein said control unit comprises an inner face oriented substantially towards the rotary member and one of the control members comprises a control light which indicates functioning thereof, which light being disposed on said inner face.

12. A control unit according to claim 1 wherein said unit comprises two devices mounted on the vehicle dashboard disposed substantially symmetrically with respect to a plane parallel to the vertical longitudinal plane of the vehicle and passing substantially through the axis of the rotary member.

13. A control unit according to claim 12 wherein said unit further comprises an assembly which groups substantially all the members for visually checking the functioning of the vehicle, and said checking assembly being disposed between said two devices.

14. A control unit according to claim 13 wherein the visual checking assembly is adjustable in position with respect to the structure of the vehicle and the adjustment of the position of said assembly, particularly the adjustment of its inclination substantially parallel to the longitudinal vertical plane of the vehicle, is effected as a function of the location of the driver's eyes, when said driver is sitting in his normal driving position.

15. A control unit according to claim 1 wherein each of said control members is formed with exterior configurations which are distinct from one another whereby they are identifiable respectively by the sense of touch.

* * * * *

UNITED STATES PATENT AND TRADEMARK OFFICE
CERTIFICATE OF CORRECTION

PATENT NO. : 3,946,827
DATED : March 30, 1976
INVENTOR(S) : JEAN GEORGES CADIOU

It is certified that error appears in the above-identified patent and that said Letters Patent are hereby corrected as shown below:

```
     First page, bibliographic data, at "[30]", change
"Dec. 6, 1972  France ........ 72.43650" to -- Dec. 6, 1971
France ........ 71.43650 --.
     Column 2, line 49, change "connect" to -- connection --.
     Column 4, line 49, change "prpjection" to -- projection --.
```

Signed and Sealed this

Fourteenth Day of September 1976

[SEAL]

Attest:

RUTH C. MASON
Attesting Officer

C. MARSHALL DANN
Commissioner of Patents and Trademarks